Nov. 2, 1948.  A. B. KING  2,452,662
TRIGONOMETRIC CALCULATOR
Filed Dec. 11, 1943  4 Sheets-Sheet 1

INVENTOR.
Anthony B. King.
BY
ATTORNEYS.

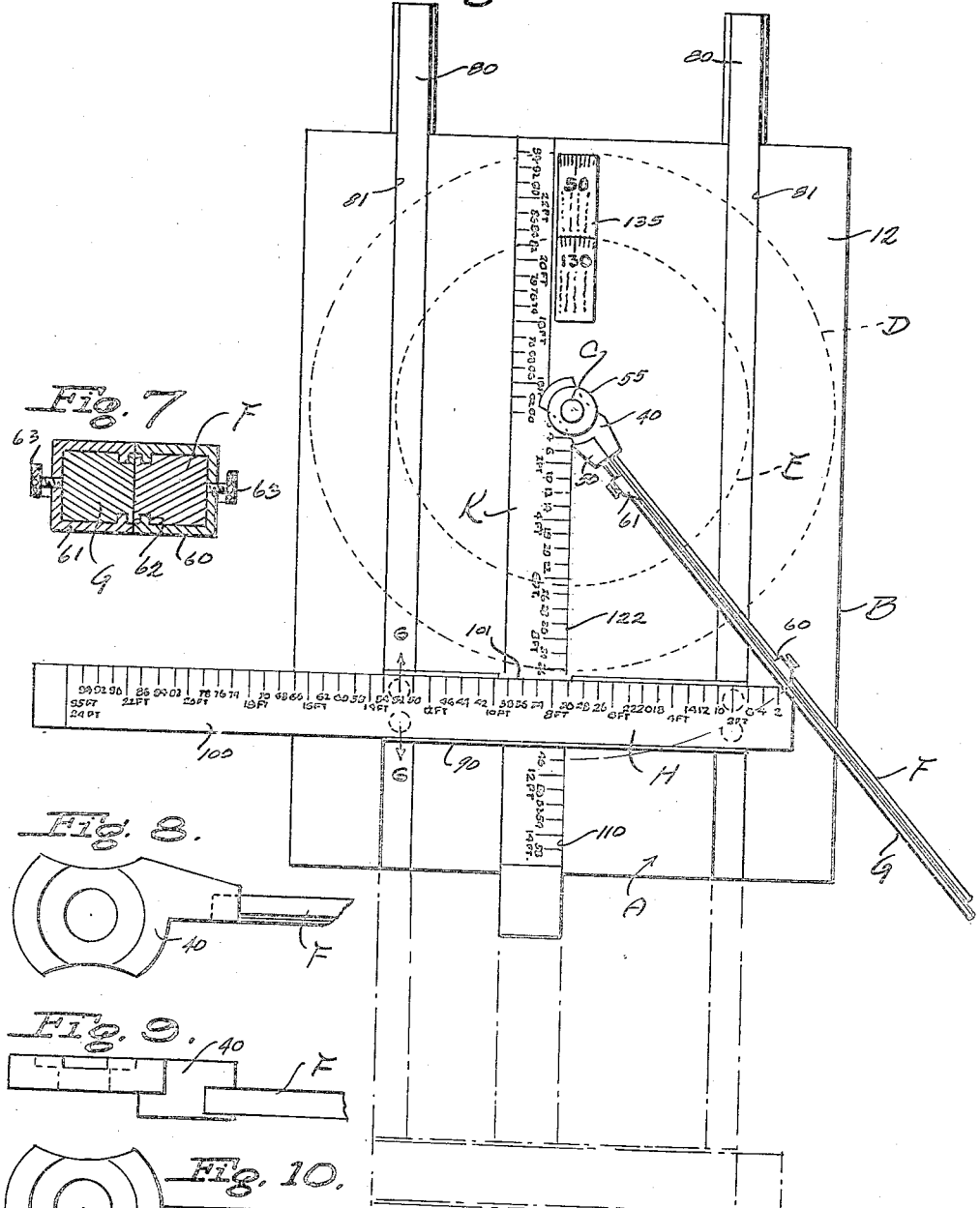

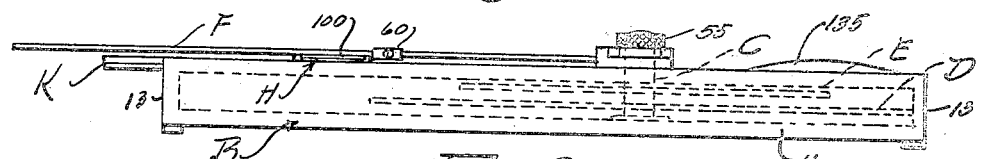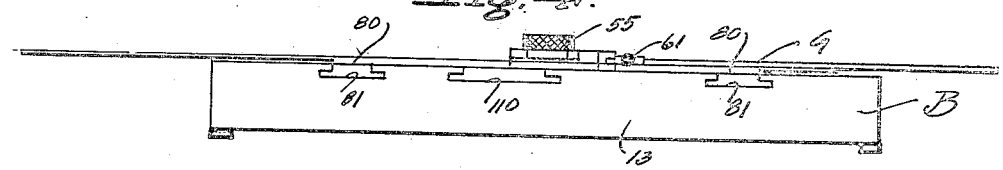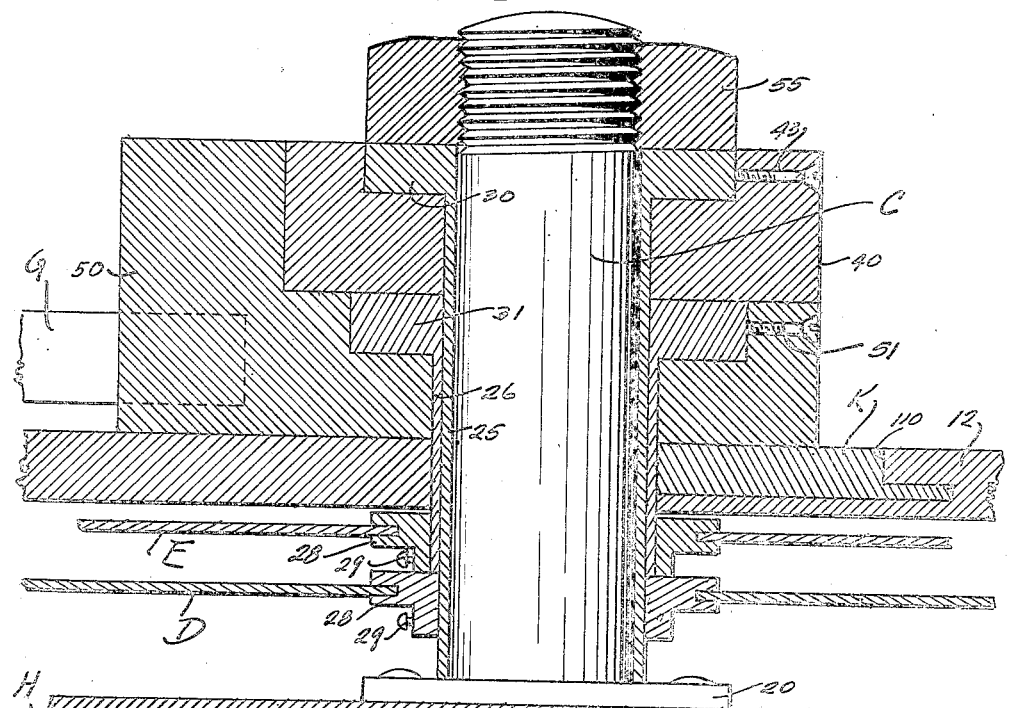

Nov. 2, 1948.   A. B. KING   2,452,662
TRIGONOMETRIC CALCULATOR
Filed Dec. 11, 1943   4 Sheets-Sheet 4
Fig. 12
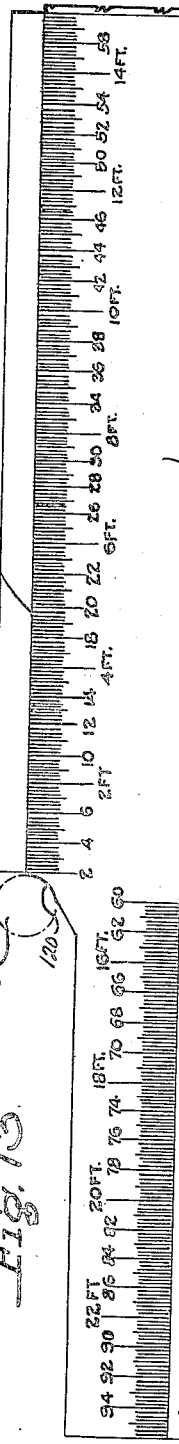
Fig. 13
Fig. 14
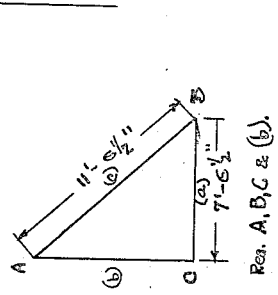
Req. A, B, C & (b).
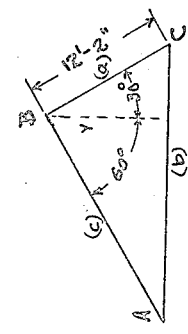
Req. (b), (c) & Y
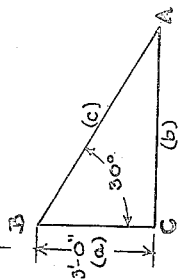
Req. (b) & (c).
Req. (c) & (b).
INVENTOR.
Anthony B. King.
BY
ATTORNEYS.

Patented Nov. 2, 1948

2,452,662

UNITED STATES PATENT OFFICE 2,452,662

TRIGONOMETRIC CALCULATOR

Anthony B. King, Brooklyn, N. Y.

Application December 11, 1943, Serial No. 513,942

12 Claims. (Cl. 33—97)

This invention relates to improvements in instruments for solving trigonometrical problems.

The primary object of this invention is the provision of a trigonometrical calculator by means of which speedy calculations can be made without the necessity of paper work.

A further object of this invention is the provision of a trigonometrical instrument which will find use wherever trigonometrical calculations are necessary, and which is so simple and readily operated that it can be used for the purpose of instruction.

Other objects and advantages of the invention will be apparent from the following detailed description.

In the accompanying drawings, forming a part of this specification, and wherein similar reference characters designate corresponding parts thruout the several views, Figure 1 is a plan view showing the protractor arrangement of the improved calculator.

Figure 2 is a plan view of the calculator in assembled relation with the scale and cursor arms in position for solving a trigonometrical problem.

Figure 3 is a side elevation of the improved calculator.

Figure 4 is a front elevation of the calculator.

Figure 5 is a vertical sectional view taken thru the pivot point of the cursor arms.

Figure 6 is a cross sectional view taken substantially on the line 6—6 of Figure 2.

Figure 7 is a cross sectional view taken thru the cursor arms showing the markers assembled thereon.

Figures 8, 9, 10 and 11 are views showing the cursor arm pivot connections.

Figures 12 and 13 are plan views of scales employed with the instrument.

Figure 14 is a view showing some of the problems which can be readily and speedily solved with the improved calculator.

Figure 1:
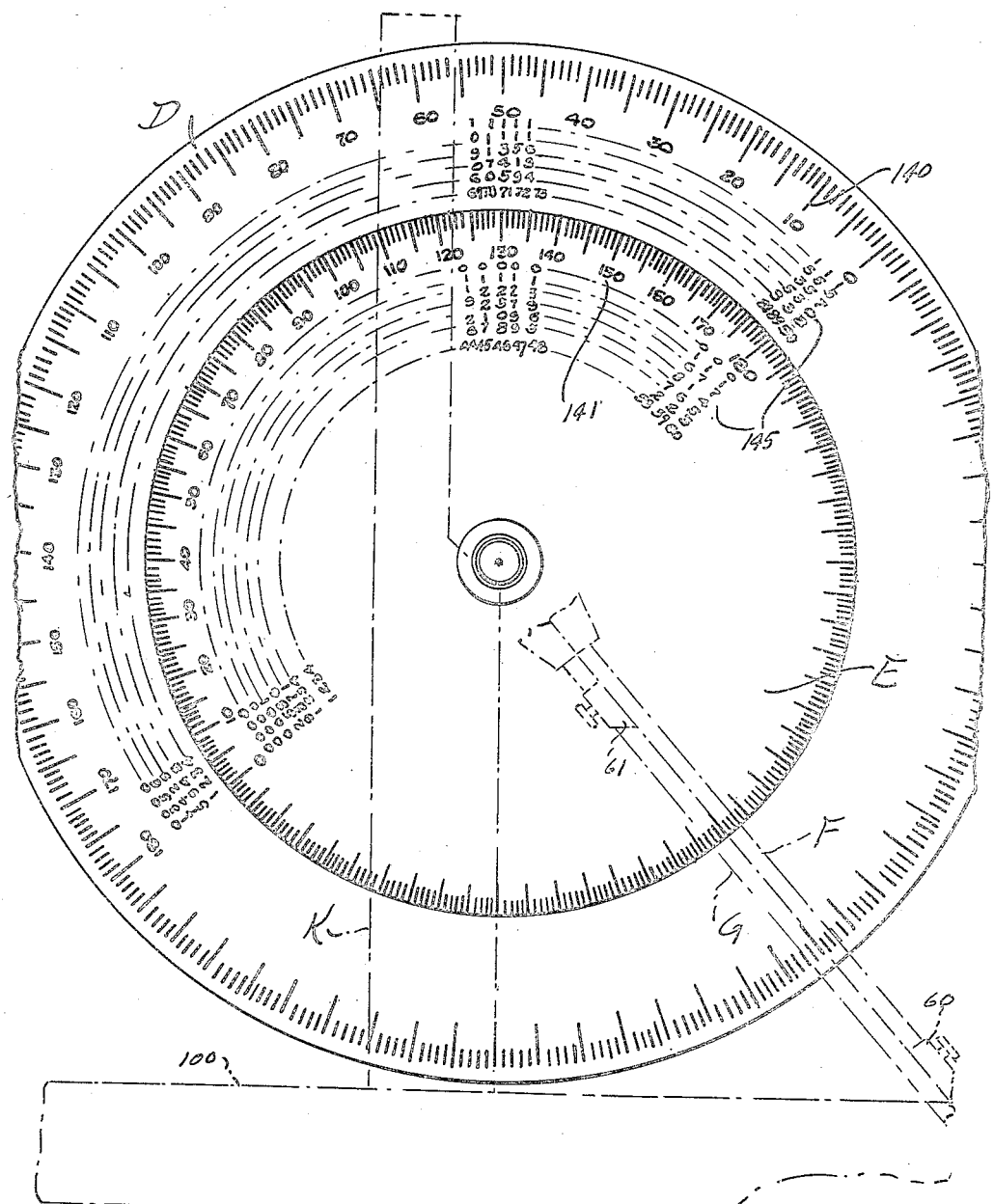

In the drawings, wherein for the purpose of illustration is shown only a preferred embodiment of the invention, the letter A may generally designate the trigonometric calculator which comprises a casing B provided with a protractor shaft C upon which protractors D and E are mounted for independent rotation, and to which protractors cursor arms F and G are respectively connected for cooperative action with scale assemblages H and K, to be subsequently detailed.

It is intended to provide a relatively small and compact unit, and the parts have been assembled, as will be hereinafter described in order to accomplish this. I have in mind the provision of a calculator which will merely measure six inches in length, five inches in overall width and approximately an inch in depth. These dimensions can, of course, be varied to suit the particular need for the calculator.

The casing B preferably comprises a base 10, side walls 11, a top wall 12 and rear and front walls 13.

The protractor shaft C is mounted as shown at 20 upon the base 10 and extends upwardly thru an opening in the top wall 12.

Sleeves 25 and 26 are rotatably supported upon the shaft C; the sleeve 25 within the sleeve 26; the lower ends of these sleeves depending into the compartment of the casing B where they support the protractors D and E respectively, as by means of hubs 28 having set screws 29 for this accomplishment.

The sleeves 25 and 26 extend upwardly above the top wall 12 of the casing B and are there provided with annular flanges 30 and 31 respectively; the sleeve 25 extending upwardly above the flange 31 of the sleeve 26 so that the cursor arms F and G may be appropriately attached to these sleeves.

The cursor arms F and G are of a length sufficient to cooperate with the scale arrangements H and K for the solving of a wide range of trigonometrical problems.

The cursor arm F is provided with a hub connection 40, shown in Figures 8 and 9 of the drawings, adapted to receive the sleeve 25 and its flange 30 in a socketed relation therein by means of which the said cursor arm F is connected with the protractor D so as to move the latter. If desired, a set screw 43 may be provided for connecting the hub portion 40 with the flange 30. Similarly the cursor arm G has a hub extension 50 thru which the sleeve 26 extends and within which the flange 31 is socketed. The connection may be rendered secure by means of a set screw 51 so that movement of the cursor arm G will move the protractor E.

It is to be noted that the hub extensions 40 and 50 are of such nature that the cursor arms F and G lie side by side and swing in exactly the same plane.

The protractor shaft C at its upper end is screw threaded for receiving a thumb nut 55 by means of which the position of the cursor arms may be maintained in relation to the scales. Of course the frictional resistance offered by the thumb nut 55 may be such that the cursor arms may be moved independently, but with sufficient frictional resistance to prevent accidental displacement of them relative to each other and the scales.

The cursor arms F and G are provided with slidable markers 60 and 61 respectively, shown in Figures 2 and 7 of the drawings. They are of U-shaped cross section and provided with a pointed end which lies flush with the measuring edge or side of the cursor arm on which they are positioned; the slidable connection being established by grooving the upper and lower surfaces of the arms and providing ribs 62 upon the markers slidable in these grooves. Thumb screws 63 may be provided to clamp the markers in desired position upon their respective arms.

Referring to the scale arrangement H, a supporting frame for the same is provided by means of which a scale can be bodily moved towards and away from the pivot point of the cursor arm. This frame consists of elongated supporting members 80 slidably dovetailed in grooves 81 provided inwardly from the top of the casing wall 12, and equidistant at opposite sides of the pivot point of the cursor arms. The dovetailed slots 81 extend the full length of the wall 12 so that the guide members 80 can be slid for considerable length forwardly and rearwardly. On their ends adjacent the operator the guide members 80 are provided with a channel-shaped scale supporting guide 90 which may be of metal, with very thin walls; the same being secured as by elements 91 to the guide members 80 in the relation shown in Figure 6 of the drawings. A scale 100 is slidably disposed in the channel of this member 90 for horizontal movement therein. Of course the position of the scale 100 may be varied with respect to the pivot point of the cursor arms by sliding the guides 80 in their grooves of the casing E, as shown in the dot and dash lines in Figure 2 of the drawings. It is noted that a portion of one wall of the channel 90 is removed at the point where the scale K cooperates with the scale 100 to facilitate calculations. The edge 101 of the scale is the measuring edge.

The scale K is provided with side flanges for slidably dovetailing it in a dovetailed groove 110 provided inwardly of the top surface of the casing wall 12. To avoid having the scale K extending out of the body of the instrument unnecessarily, I propose to provide a scale with a lower portion having delineations within the range of normal calculations; the upper portion being reduced and provided with delineations which comprise a continuation of the delineations on the lower portion. The scale is provided with a corner socket 120 mounted to abut against some portion of the pivot connection of the cursor arms; the scale K being so arranged that the measuring edge 122 intersects the center or axis of the shaft C. Of course the scale K is vertically slidable and the measuring edge 122 is at right angles to the edge 101 of the scale 100.

Referring to Figures 2 and 3, it will be noted that a magnifying lens or pane 135 is positioned in the top wall 12 of the casing B thru which are visible the delineations upon the protractors D and E.

The protractor D has delineations thereon (designated at 140) representing degrees, and the protractor E has delineations thereon (designated at 141) representing degrees. Each of the protractors D and E are provided with radial lines of figures designating natural constants. Beneath each of these radial lines of natural constants appears a degree or minute delineation to which the natural constant is pertinent. The regular degree marks 140 and 141 of the protractors have no relation to the positioning of the natural constants and their respective degree and minute numbers. The constants will find a useful purpose in the determination of lengths of arcs, or pipes subtended by a given angle. If it is desired to find the constant for a given degree or minute, it is simply necessary to find the required degree or minute and above it will appear the natural constant.

The delineations upon the scales 100 and K may vary to suit the requirements of the instrument. In the example shown there are two sets of delineations upon each of these scales, one set ranging from zero to ninety-five, and the other set ranging from zero to twenty-four. The markings on these scales indicate that the delineations represent feet and the sub-divisions are inches and fractions thereof.

It should be remembered that this instrument is capable of solving all right angle trigonometric problems, in which case the protractor D and its cursor arm F are solely used. Oblique and obtuse triangular problems may also be solved, but in that case both cursor arms are necessary.

In Figure 14 is shown a variety of right angled triangles and the different problems which can be speedily solved with the instrument without the necessity of any complicated paper work. In order to understand the function of the instrument, it is only necessary to describe the solving of one of these problems; the same being the problem represented by the right angled triangle shown at the extreme right of Figure 14. The instrument as shown in Figure 2 is set for the solving of this problem. It is noted that the hypotenuse length is given as well as the base length. It is then required to find the angles A, B and C and the length of the side (b). To solve the problem, the scale K is positioned as shown in Figure 2. The cursor arm F is swung parallel with the scale K and the marker 60 is set upon this cursor arm at the 11'6½" delineation upon the scale K. The scale 100 is now moved into position to measure off 7'6½" from the measuring edge 122 of scale K. With the scale 100 in this position the same is bodily moved in a line normal thereto and the cursor arm F is also swung so that the marker 60 points to the 0 delineation on the scale 100. With the parts in this position, the protractor D shows thru the lens 135 that the angle A is about 41°, and the measurement on the scale K at the edge 101 of the scale 100 shows that the vertical side (b) of the triangle measures 8'9½". The angle (B) of course measures 90°—A. or about 49°.

Referring again to the delineations on the top left side of scale K, it can readily be seen that for dimensions above 60' 0" on the 95' 0" scale, it is only necessary to withdraw the scale K and read from the center at the 60 delineation point. Consequently, all dimensions read from this scale for lengths on hypotenuse, etc. should be read by bringing the marker of the cursor arm in contact with the last division on the scale (60' 0") measuring the length from the said point. It will, of course, be necessary to adjust this scale to meet the already determined position of the marker. This method also applies to the other delineation scale running from 15' to 24' in measurement.

For the solving of an oblique angle the apex is always regarded as the center of pivoting of the cursor arms. This requires a division of the base, since a portion thereof will extend beyond the normal measuring edge of the scale K. The cursor F would then be used at the right hand side of the measuring edge of the scale K and the cursor arm G at the left hand edge of this scale. In case of an obtuse triangle, the dimensions of the base will fall remotely to the right of the normal measuring edge of the scale K and both cursor arms will necessarily be employed to the right of the scale K and spaced from the measuring edge thereof the required distance to solve such problem.

For the use in determining the length of an arc where natural constants are employed, having solved the trigonometric problem on the instrument and with the length of the hypotenuse or radius and minutes known, it is simply necessary to look for the natural constants above the degrees and minutes, calculating from a unit of one. Adding both the degrees and minutes together, the combined constants are then multiplied by the radius or hypotenuse of the given problem to ascertain the length of the arc.

Various changes in the shape, size and arrangement of parts may be made to the form of invention herein shown and described, without departing from the spirit of the invention or the scope of the following claims.

I claim:

1. A trigonometric calculator comprising a supporting frame, a pair of scales slidably mounted thereon at right angles to each other, a plurality of degree protractors, and arm-like members connected individually with said protractors and being movable independently of each other over the other scales in indicating relation with respect to delineations upon said scales.

2. In a trigonometric calculator the combination of a supporting frame, a pair of scales slidably mounted upon said frame in crossing relation with respect to each other, means for guiding at least one of said scales along the frame to permit its movement bodily in a line parallel with the movement of the other scale, a protractor having degrees designated thereon centered at the reading edge of one of the scales, and a cursor arm connected to the protractor and being movable over and in measurement determining relation with respect to the delineations of both of said scales.

3. In a trigonometric calculator, a supporting framework, a pair of related scales slidably mounted upon said frame in cross-wise relation to each other, means mounting one of said scales for bodily movement upon the supporting framework in a line of movement of the other scale, a pair of protractors rotatably supported upon said framework having degree delineations thereon, said protractors having a common center at the reading edge of one of the scales and arms respectively connected with said protractors and independently movable over the scales in indicating relation with respect to the delineations of both of said scales.

4. In a trigonometric calculator the combination of a framework, a scale slidable upon said framework for determining the measurement of the base line of triangles, a scale slidable upon said framework across the first scale for determination of the vertical sides or altitudes of triangles, means for guiding movement of the first mentioned scale to permit movement thereof bodily upon the framework in a line paralleling the line of movement of the second scale, a protractor having degree delineations thereon, and an arm connected with said protractor for movement therewith arranged to move over the scales with the delineations of both of said scales for determining the hypotenuse measurement of triangles by intersecting delineations of both scales.

5. In a trigonometric calculator the combination of a framework, a scale slidable upon said framework for determining the measurement of the base line of triangles, a scale slidable upon said framework in a line normal to the first scale for determination of the vertical sides or altitudes of triangles, means for guiding movement of the first mentioned scale to permit its movement bodily upon the framework in a line paralleling the line of movement of the second scale, a pair of protractors rotatably supported upon said frame for independent rotation, each having degree delineations thereon, and arms respectively connected with said protractors for rotation therewith and adapted to move over the scales in indicating relation with respect to delineations thereof.

6. In a trigonometric calculator the combination of a casing having a compartment therein and a reading opening therein, a pair of protractors rotatably mounted in said casing in concentric relation, one of said protractors being smaller than the other and positioned so that the delineations of both of said protractors will be visible over a small area of the protractors thru the opening of said casing, scale means upon said casing, and measuring means connected with said protractors and movable independently over the scale means.

7. In a trigonometric calculator the combination of a supporting frame, scales mounted crosswise upon said frame for relative sliding movement, a protractor rotatably centered at the reading edge of one of the scales upon the frame, an arm connected with the protractor and movable therewith in relation to delineations upon said scales, and an indicator slidably mounted upon the arm for cooperation with the delineations of said scales.

8. A calculating device for determining triangles, consisting of a bearing, a shaft thereon, a sleeve on the shaft, a protractor mounted on the sleeve to turn therewith, a sleeve mounted on the first sleeve, a protractor mounted on the second sleeve to turn therewith, scales arranged in cross wise relation to each other for cross-wise sliding relation, one of said scales also having a sliding movement parallel to the movement of the other scale, and arms connected with the sleeves and mounted to turn in a common horizontal plane over the scales as an indicator of delineations thereon, one of the scales having its reading edge disposed across the center of the protractors, and one of the protractors being smaller than the other protractor.

9. A device for calculating the angles of triangles, consisting of a frame, a scale mounted to slide on the frame, a second scale mounted to slide in a parallel direction to the first scale on the frame and also having a sliding movement across the first scale, a protractor mounted to turn on a center at the reading edge of one of the scales, and an arm connected with the protractor to turn the same and arranged to swing over both scales in indicating relation with respect to delineations on both scales.

10. A device for calculating the angles of triangles, consisting of a frame, a shaft mounted thereon, a sleeve mounted to turn on the shaft, a protractor mounted to turn with the sleeve, a scale having a sliding movement on the frame and having its reading edge positioned across the axis of the protractor, a second scale mounted at right angles to the first scale to slide across said scale and also having an independent sliding movement on the frame in a direction parallel to the sliding movement of the first scale, an arm connected to the sleeve to turn with the protractor, and an indicator slidable on the arm, the arm being arranged to swing over the scales in indicating relation with respect to delineations thereof.

11. The combination set forth in claim 10, the shaft having a second sleeve mounted to turn on the first sleeve, a second and smaller protractor mounted to turn with said second sleeve, and a second arm connected with said second sleeve to turn in a common horizontal plane with the first arm.

12. In a trigonometric calculator the combination of a casing-like member, a small opening in the casing, a protractor rotatably mounted within the casing having degree delineations thereon which are visible in a small area thru the opening aforesaid, scales slidably supported by said casing having delineations thereon in visible relation, and an arm connected with said protractor to permit turning of the same and adapted to swing over the scales in indicating relation with respect to delineations thereof.

ANTHONY B. KING.

REFERENCES CITED

The following references are of record in the file of this patent:

UNITED STATES PATENTS

| Number | Name | Date |
|---|---|---|
| 1,678,019 | Oates | July 24, 1928 |
| 1,686,441 | Dauger | Oct. 2, 1928 |
| 1,894,886 | Paskowski | Jan. 17, 1933 |
| 1,965,017 | Wellington | July 3, 1934 |

FOREIGN PATENTS

| Number | Country | Date |
|---|---|---|
| 7,884 | Great Britain | 1909 |